(12) United States Patent
Jury et al.

(10) Patent No.: US 10,005,331 B2
(45) Date of Patent: Jun. 26, 2018

(54) TOOL FOR FASTENING TRAILER SAFETY CHAINS

(71) Applicant: JMW Enterprises, LLC, Farmington, IA (US)

(72) Inventors: James Jury, Farmington, IA (US); Craig Witting, Keosauqua, IA (US); Jerry McCarty, Donnellson, IA (US)

(73) Assignee: JMW Enterprises, LLC, Farmington, IA (US)

( * ) Notice: Subject to any disclaimer, the term of this patent is extended or adjusted under 35 U.S.C. 154(b) by 901 days.

(21) Appl. No.: 14/276,557

(22) Filed: May 13, 2014

(65) Prior Publication Data
US 2014/0331471 A1    Nov. 13, 2014

Related U.S. Application Data

(60) Provisional application No. 61/855,263, filed on May 13, 2013.

(51) Int. Cl.
| | |
|---|---|
| *B60D 1/28* | (2006.01) |
| *B60D 1/58* | (2006.01) |
| *B60D 1/52* | (2006.01) |
| *B60D 1/54* | (2006.01) |
| *B60D 1/04* | (2006.01) |
| *B60D 1/02* | (2006.01) |

(52) U.S. Cl.
CPC ............. *B60D 1/28* (2013.01); *B60D 1/58* (2013.01); *B60D 1/02* (2013.01); *B60D 1/04* (2013.01); *B60D 1/52* (2013.01); *B60D 1/54* (2013.01); *B60D 1/583* (2013.01); *Y10T 29/49826* (2015.01)

(58) Field of Classification Search
CPC ... B60D 1/28; B60D 1/52; B60D 1/54; B60D 1/58; B60D 1/583; B60D 1/02; B60D 1/04; Y10T 29/49826; Y10T 29/53796–29/53943
USPC ....... 29/428, 244–278; 280/432, 504; 269/3, 269/6; 294/26, 175, 19.3, 209, 210
See application file for complete search history.

(56) References Cited

U.S. PATENT DOCUMENTS

| | | | | |
|---|---|---|---|---|
| 653,021 | A * | 7/1900 | Hamilton | B63B 21/04 114/230.26 |
| 791,009 | A * | 5/1905 | Cooper | B25B 1/24 100/1 |
| 1,187,193 | A * | 6/1916 | Smith | A01K 97/14 294/19.3 |

(Continued)

*Primary Examiner* — Bayan Salone
(74) *Attorney, Agent, or Firm* — McKee, Voorhees & Sease, PLC (57) ABSTRACT

The disclosed apparatus, systems and methods relate to a safety chain tool for use with gooseneck trailers. Various embodiments of the tool allow the user to remotely affix the safety chains of a gooseneck trailer, and are configured so as to be left in the bed of the truck during transport so as to allow for easy removal of the chains. In certain implementations, the tool comprises an elongate shaft with a handle at one end and a coupling mechanism at the other, wherein the coupling mechanism is fixedly attached to a chain and a clasp. In certain embodiments, the shaft contains a operational mechanism configured to actuate the clasp. In certain embodiments, this actuation is achieved by extending the ends of the shaft relative to one another.

18 Claims, 9 Drawing Sheets

(56) References Cited

U.S. PATENT DOCUMENTS

| | | | | |
|---|---|---|---|---|
| 2,730,985 | A * | 1/1956 | Wingate | B63B 21/54 114/221 R |
| 2,924,482 | A * | 2/1960 | Gibson | A01K 97/14 294/19.3 |
| 3,823,971 | A * | 7/1974 | Golden | A01K 97/14 294/19.3 |
| 3,843,981 | A * | 10/1974 | Verest | B25B 25/00 254/131 |
| 4,297,916 | A * | 11/1981 | Burroughs | F16G 11/12 16/422 |
| 4,595,223 | A * | 6/1986 | Hawie | B25J 1/04 294/175 |
| 4,778,181 | A * | 10/1988 | Arney | B25F 1/00 294/26 |
| 4,793,646 | A * | 12/1988 | Michaud, Jr. | B63B 21/54 114/221 R |
| 5,065,488 | A * | 11/1991 | Chapman | B25B 27/02 292/78 |
| 5,775,674 | A * | 7/1998 | Bigham | B66F 15/00 254/130 |
| 5,823,590 | A * | 10/1998 | Forrest | E04D 13/0765 294/104 |
| 5,832,651 | A * | 11/1998 | Arntz | A01K 97/14 294/19.3 |
| 6,193,432 | B1 * | 2/2001 | Kampfert | B63B 21/54 294/82.19 |
| 6,293,601 | B1 * | 9/2001 | Johnson | A01K 97/14 294/175 |
| 6,363,876 | B1 * | 4/2002 | Blake | B63B 22/02 114/221 R |
| 6,485,075 | B1 * | 11/2002 | McClain | A63B 47/02 294/19.2 |
| 6,708,585 | B1 * | 3/2004 | Posenauer | B25C 1/02 29/255 |
| 6,736,183 | B2 * | 5/2004 | Magnani | B60C 25/02 157/1.3 |
| 6,742,415 | B2 * | 6/2004 | Scott | E05B 79/20 269/3 |
| 6,964,407 | B1 * | 11/2005 | Butler | B66F 19/005 254/131 |
| 7,293,759 | B2 * | 11/2007 | Beach | B66F 19/005 254/120 |
| 7,673,912 | B2 * | 3/2010 | Breininger | B25B 9/00 294/210 |
| 7,946,012 | B2 * | 5/2011 | Cox | B25B 27/14 29/255 |
| 8,210,584 | B2 * | 7/2012 | Hiltz | B25D 1/00 294/175 |
| 8,398,134 | B1 * | 3/2013 | Mortensen | B66F 19/00 248/925 |
| 8,434,737 | B2 * | 5/2013 | Zhou | B66C 23/48 254/2 B |
| 8,443,747 | B1 * | 5/2013 | Cardarelli | B63B 21/04 114/221 R |
| D684,443 | S * | 6/2013 | Thompson | D8/14 |
| 8,469,339 | B2 * | 6/2013 | Liberato | B66C 13/08 24/265 H |
| 8,726,767 | B2 * | 5/2014 | Flamion | B25B 13/28 81/111 |
| 8,789,810 | B2 * | 7/2014 | Weinreich | B66F 15/00 254/131 |
| 9,211,938 | B1 * | 12/2015 | Cardarelli | B63B 21/04 |
| 9,347,598 | B1 * | 5/2016 | Parnell | F16L 55/18 |
| 9,371,079 | B1 * | 6/2016 | Owens | B61H 13/02 |

* cited by examiner

TOOL FOR FASTENING TRAILER SAFETY CHAINS

CROSS-REFERENCE TO RELATED APPLICATION(S)

This application claims priority to U.S. patent application Ser. No. 61/855,263, filed May 13, 2013, which is incorporated herein in its entirety by this reference

TECHNICAL FIELD

The disclosure relates generally to apparatus, systems and methods for use with gooseneck trailers. More specifically, the apparatus, systems and methods relate to a safety chain tool for fastening safety chains.

BACKGROUND

Gooseneck trailers include a coupler on the front of the trailer which latches onto a hitch ball in the bed of a pickup truck. This type of hitch normally requires an operator to climb into the bed of the truck to engage and disengage the lock mechanism for the gooseneck receiver and the hitch ball. Recently, improved assemblies allow the hitch receiver and hitch ball to be assembled without the operator climbing into the truck bed; however, an operator still has to climb into the truck bed to hook and unhook the safety chains which extend from the trailer to U-bolts in the bed of the truck.

Therefore, a primary objective of the present invention is the provision of a tool to remotely hook and unhook the safety chains from a position outside the truck bed without the operator climbing into the truck bed.

A further objective of the present invention is the provision of a tool for hooking and unhooking safety chains which is simple, effective, and safe in use.

These and other objectives will become apparent from the following description of the invention.

BRIEF SUMMARY

Discussed herein are various embodiments of the safety chain tool and associated systems and methods. The disclosed apparatus, systems and methods relate to a safety chain tool for use with gooseneck trailers. Various embodiments of the tool allow the user to remotely affix the safety chains of a gooseneck trailer, and are configured so as to be left in the bed of the truck during transport so as to allow for easy removal of the chains. In certain implementations, the tool comprises an elongate shaft with a handle at one end and a coupling mechanism at the other, wherein the coupling mechanism is fixedly attached to a chain and a clasp. In certain embodiments, the shaft contains a operational mechanism configured to actuate the clasp. In certain embodiments, this actuation is achieved by extending the ends of the shaft relative to one another.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Discussed herein are various embodiments of the safety chain tool and associated systems and methods. In a typical goose-neck hitch configuration, a gooseneck trailer ball hitch is mounted in the truck bed of a pickup truck, rather than below the back bumper. Typically, a plurality of U-bolts are also in the bed of the truck. After coupling the gooseneck hitch to the ball hitch, safety chains are also attached to the trailer by way of the U-bolts through the use of hooks with clasps. This is typically cumbersome to perform owing to the sides of the truck bed.

The presently disclosed safety chain tool provides an apparatus, system and method in which the safety chain and hook are permanently attached to a telescoping handle and cable system which opens and closes the hook, allowing a person to engage the U-bolt while standing at one end of the truck without needing to climb into the truck bed. Because the safety chains are attached to the gooseneck trailer, the safety chain tools always stay with the trailer, thereby reducing the burden on the user. When the chains are hooked into the U-bolts, the safety chain tools lie in the bed of the truck.

Referring now to the drawings in greater detail, FIGS. 1-18 depict various embodiments of the safety chain tool system 1. Exemplary embodiments of the tool system 1 comprise an elongate shaft 2 having first 3 and second 4 ends, a coupling mechanism (such as a hook) 23 and a chain 21. Various additional aspects will be discussed in relation to the individual figures.

Figure 1:
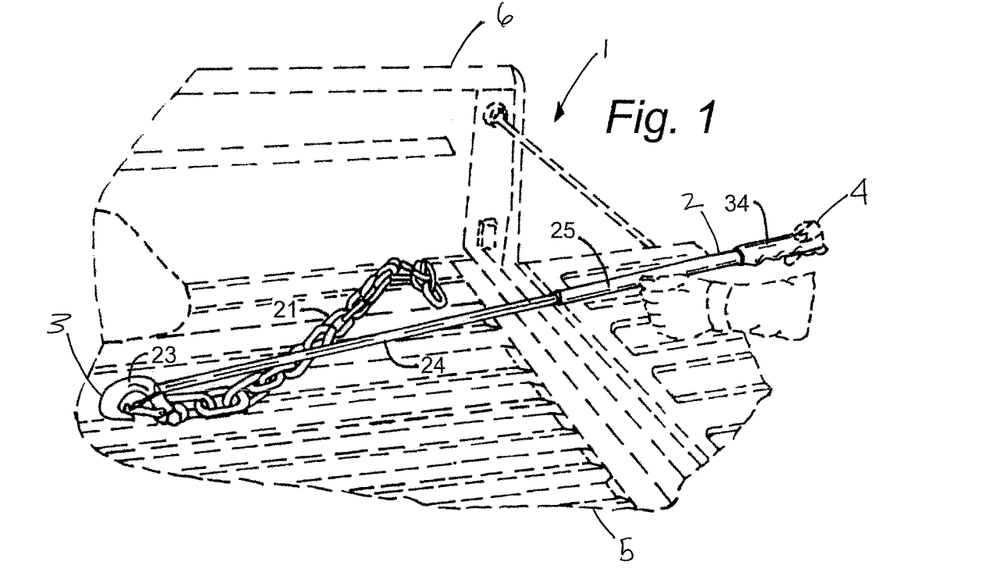
FIG. 1 is a perspective view of an exemplary embodiment of the safety chain tool in the shortened state with a closed clasp.
Figure 2:
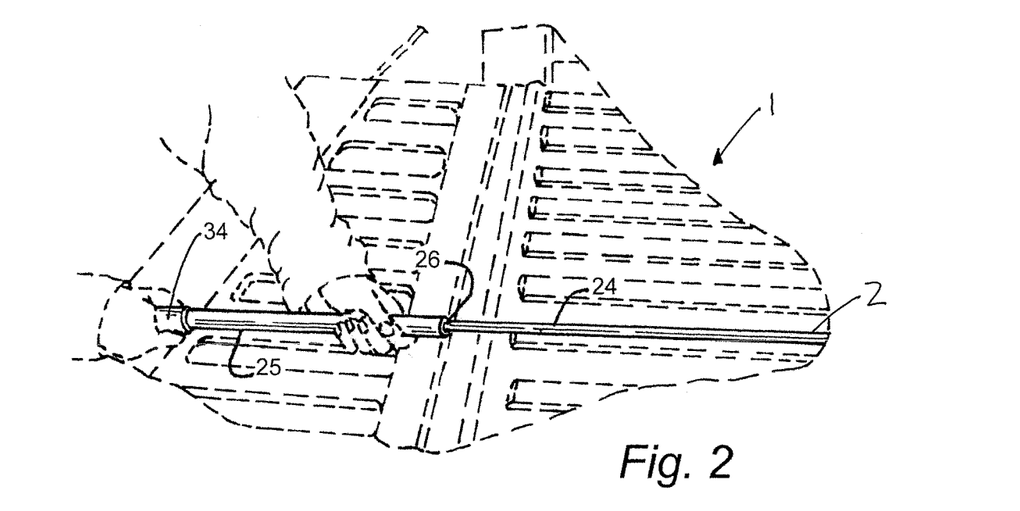
FIG. 2 is a perspective view of an exemplary embodiment of the safety chain tool in use.
Figure 12:
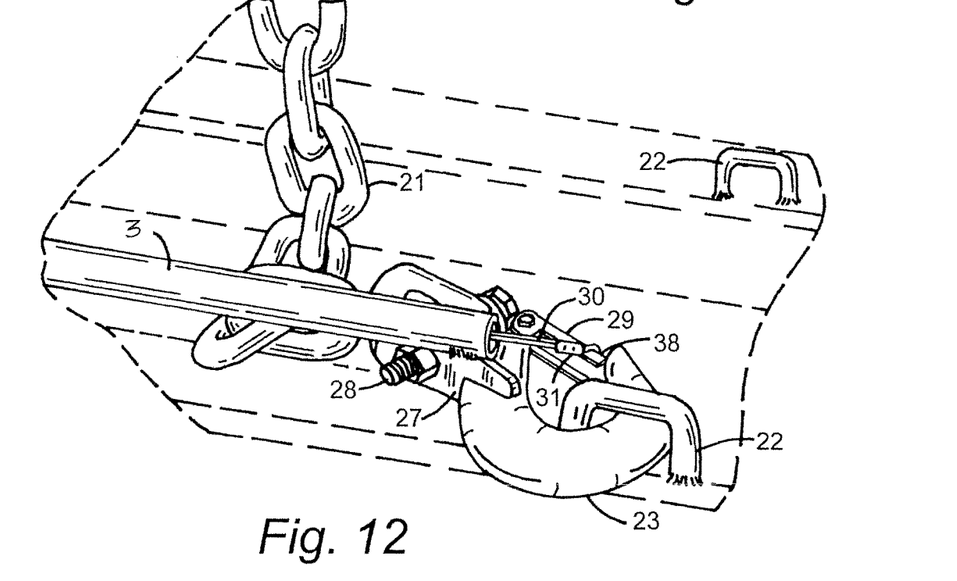
FIG. 12 is an reverse close-up view of the embodiment of FIG. 11.
Figure 13A:
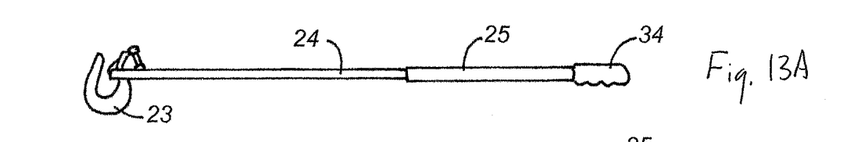
FIG. 13A depicts a side view of the tool with the shaft in the unextended position.
Figure 13B:
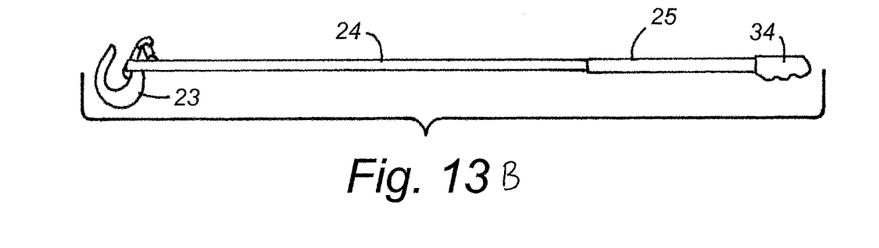
FIG. 13B is a side view of the tool with the shaft in the extended position.

As is depicted in FIG. 1, various embodiments of the tool system 1 comprise an elongate shaft 2 having first 3 and second 4 ends, wherein the first end 14 is fixedly attached to a coupling 23 (here, a hook). These embodiments are configured to operate on a ball hitch shown as 20 in FIG. 4) for a gooseneck trailer in the truck bed 5 of a pickup truck 6. As best shown in FIG. 2, in certain exemplary embodiments, the shaft 2 is a telescoping cylinder comprising inner and outer cylindrical components, such that the overall distance between the first 3 and second 4 ends can be adjusted by the user by the movement of the cylindrical components, such that the inner cylindrical component is partially subsumed by the outer cylindrical component. In certain of these embodiments, and as shown in FIG. 12, for example, this is achieved through the use of a larger-circumference section of shaft 25 which is placed around a smaller circumference shaft 24 to comprise the entire shaft 2. Other variations are possible. Various embodiments further comprise a handle 34 affixed to the second end 4. As depicted in FIGS. 2 and 5, certain embodiments feature a locking mechanism, such as a locking pin 26 to fasten or lock the shaft into the extended position. Other means can be employed.

Figure 3:
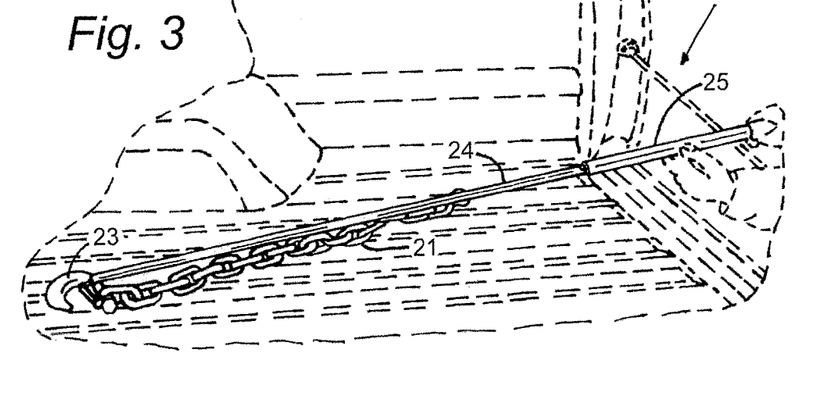
FIG. 3 is a perspective view of an exemplary embodiment of the safety chain tool in the extended state.
Figure 4:
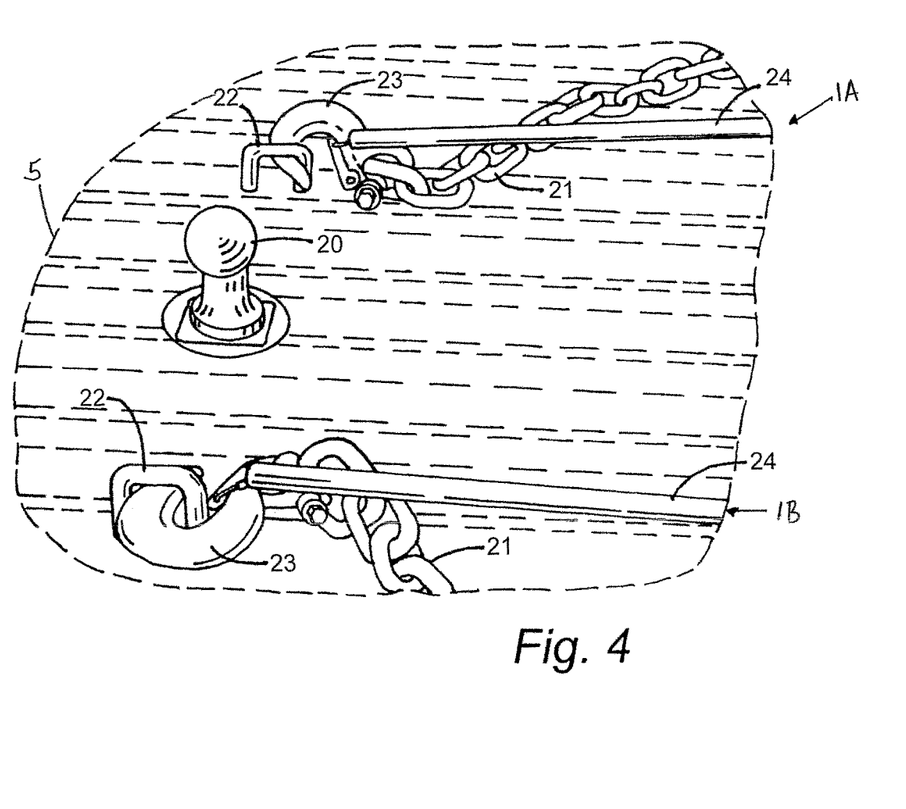
FIG. 4 is a perspective view of the safety chain tool hook of FIG. 3 engaging two U-bolts.
Figure 5:
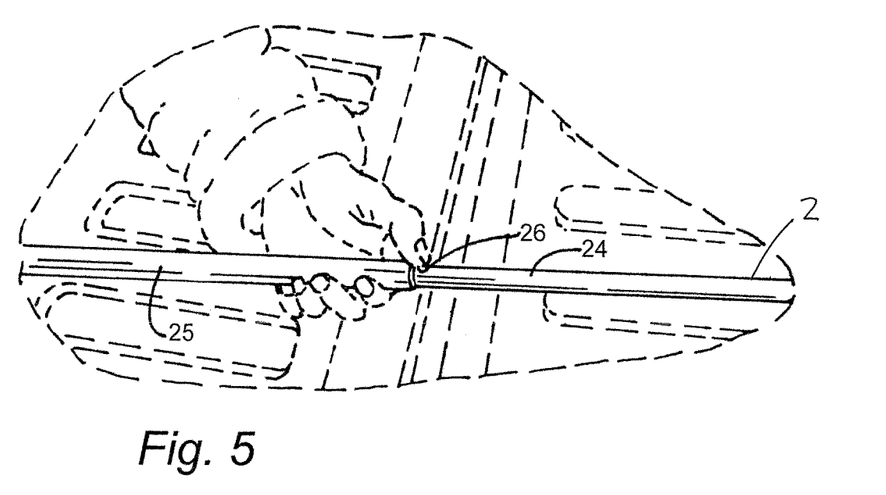
FIG. 5 is a perspective view of a person activating the locking pin to collapse the safety chain tool, according to one embodiment.
Figure 6:
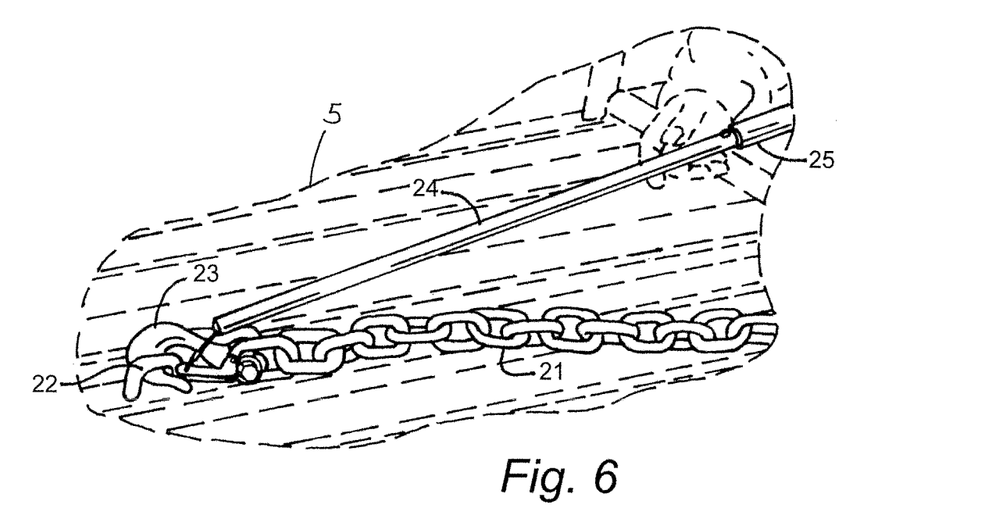
FIG. 6 is a perspective view of a person collapsing the tool and closing the clasp, according to one embodiment.
Figure 7:
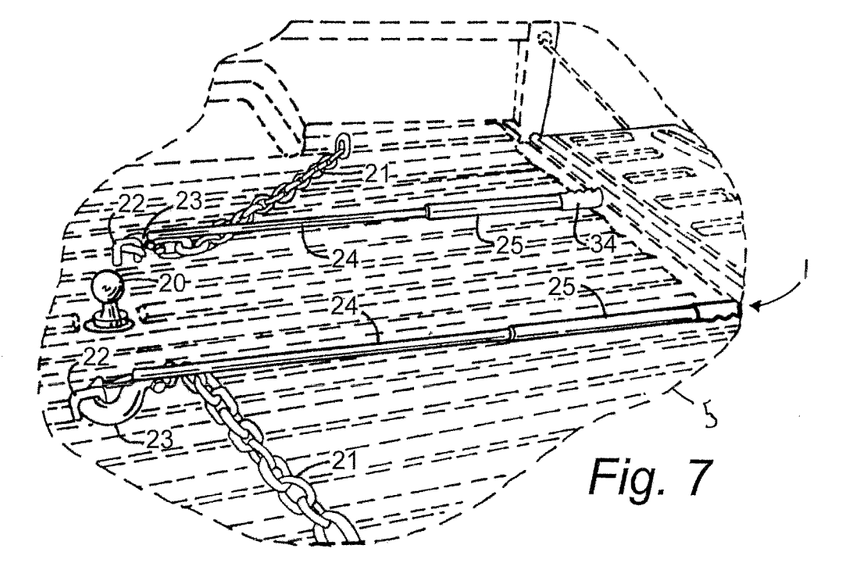
FIG. 7 is a perspective view of a plurality of safety chain tools engaged with the U-bolts in the truck bed with collapsed shafts, according to one embodiment.
Figure 8:
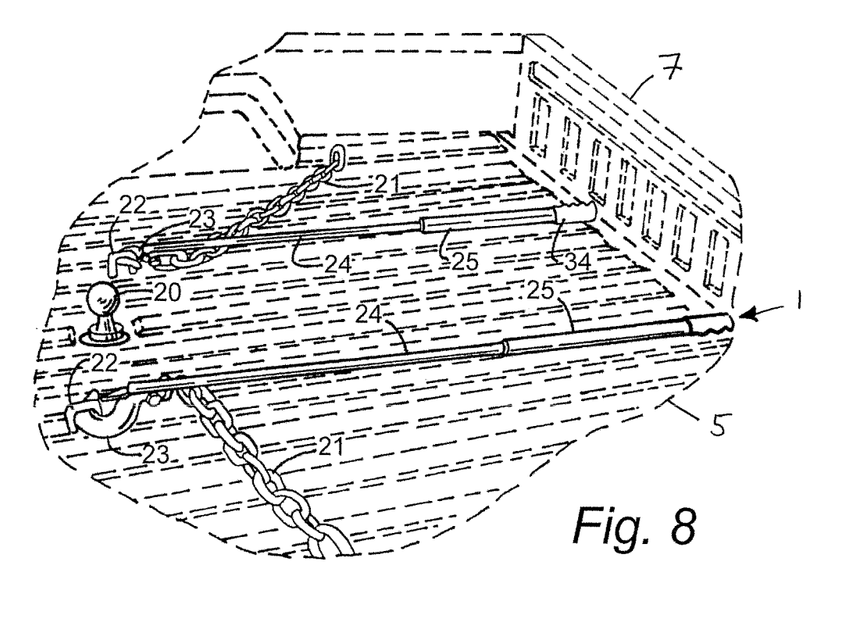
FIG. 8 depicts the embodiment of FIG. 7, with the tailgate in a closed position.

As is depicted in FIGS. 1, 3 & 4, in use the safety chain tool 1 further comprises a chain 21, which is operationally coupled to the hook 23. In these embodiments, the tool 1 can be used to fixedly attach the chain to the U-bolts 22 mounted in the bed 5 of the truck 6, as would be apparent to one of skill in the art. FIG. 6 further depicts the coupling of the hook 23 to a U-bolt 22. FIGS. 7-8 depict exemplary embodiments of the tool 1, wherein two safety chain tools 1 have been used to attach the chains 21 to the U-bolts 22 in the bed 5 of a truck, and then may be placed on the bed floor 5 for transport when the tailgate is in the up position 7.

Figure 9:
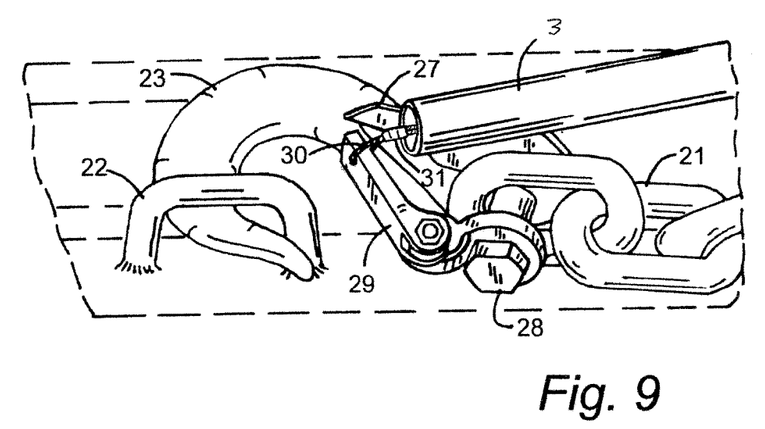
FIG. 9 is a close-up a view of the safety chain tool with the hook engaged with the U-bolt and the clasp in the open position.
Figure 10:
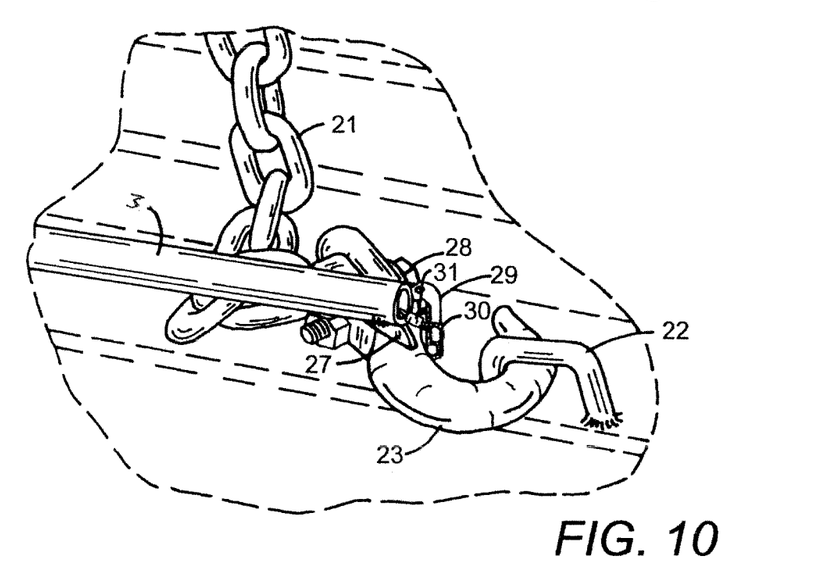
FIG. 10 is an reverse close-up view of the embodiment of FIG. 9.
Figure 11:
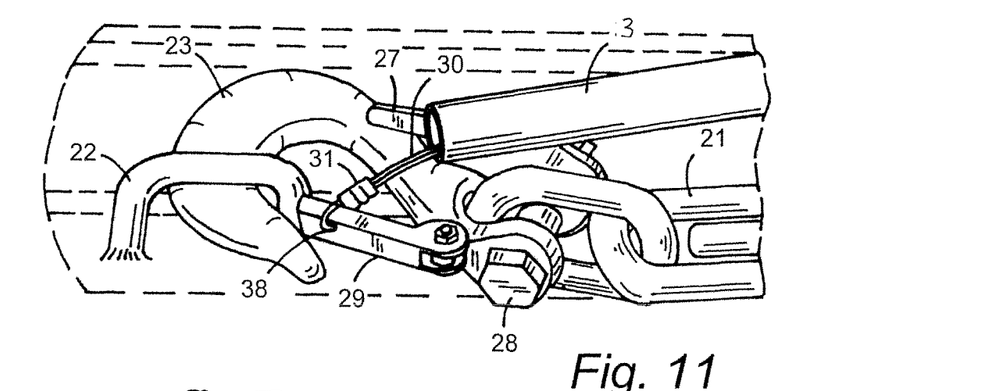
FIG. 11 is a close-up view showing the hook engaged in the U-bolt and the clasp in the closed position.

FIGS. 9-10 are detailed views of an exemplary embodiment of the chain tool's 1 coupling, or hook 23. In certain embodiments, the coupling mechanism 23 further comprises a mounting bracket 27 to which the hook 23 and chain 21 are operationally coupled. These embodiments further comprise a clasp 29 bolted 28 to a mounting bracket 27 which is fixedly attached to the first end of the shaft 3. These embodiments further comprise an actuation cable 30 and a first cable clamp 31 which are operationally coupled to the clasp so as to actuate the clasp, as described in relation to FIGS. 11-14.

Figure 14:
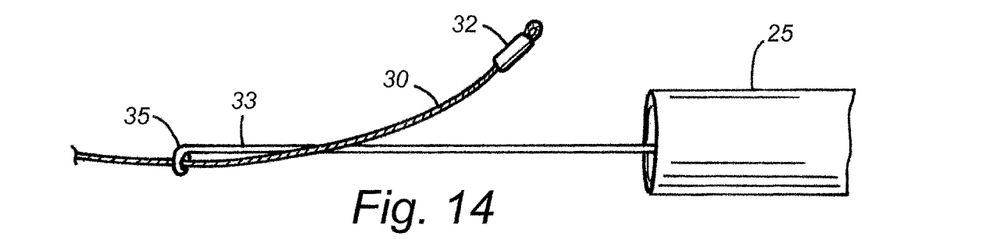
FIG. 14 depicts a side view of the internal cable, rod and loop housed inside the shaft, according to one embodiment.

FIGS. 11-14 depict the internal operation of the safety chain tool 1 according to one embodiment. In this embodiment, the tool 1 is operated by telescoping, or extending the first 3 and second 4 ends of the shaft 2 relative to one another as discussed in relation to FIG. 2, such that the two concentric, cylindrical members of the shaft 24, 25 are moved relative to one another, as is shown in the difference between FIG. 13A which shows the tool in the collapsed position and FIG. 13B, which shows the tool in the extended position. As is shown in FIG. 14, in these embodiments, the tool 1 further comprises an actuation rod 33 further comprising a rod loop 35, and the actuation cable 30 is threaded through the rod loop 35 and further comprising a second cable clamp 32 within the second end of the shaft (which in this embodiment is the larger shaft portion, 25).

In these embodiments, the actuation rod 33 is fixedly attached to the second end 25 so as to move in substantially the same direction as the second end 25. As the rod 33 is moved, an actuation cable 30 is encouraged to slide through the rod loop 35 until the second cable clamp 32 is brought into contact with the loop 35 and is brought snug or flush with the loop, so as to impede further cable 30 movement and to introduce tension on the cable. The certain of these embodiments, the cable 30 is configured to emerge through the first end is attached to the clasp 29 on the safety chain hook 23 so as to actuate the movement of the clasp. In certain embodiments, the cable 30 is looped through a hole in the clasp 29 and the looped cable 30 is fixedly attached to the first cable clamp 31. In these embodiments, the tension on the cable 30 causes the clasp 29 to pull into the open position. Thus when the first end cylinder 24 is fully extended relative to the second end cylinder 25, and the clasp 29 is open, in certain embodiments the locking pin 26 can be actuated to prevent further movement of the shaft cylinders 24, 25 relative to one another in the extended position, such that the clasp 29 is open on the hook 23.

In these embodiments, and under these conditions with the clasp 29 in a locked open position, the safety chain tool 1 is ready to engage with one of the U-bolts 22 in the bed 5 of the truck. As such, once the hook 23 has been fit into the U-bolt 22, the operator is able to operate the locking pin 26 to unlock the safety chain tool 1 from the extended, or "open" position. In these implementations, the second end of the shaft cylinder 25 is freed to move relative to the front cylinder 24, thereby relaxing the tension on the cable 30. As the front cylinder 24 collapses into the back cylinder 25, the cable 30 slides through rod loop 35 to lie within the tool in a relaxed state. The removal of tension from cable 30 allows the clasp 29 to return to the closed position on the hook 23.

As such, this operation allows a person standing at the end of the truck bed to use the safety chain tool 39 to engage and disengage the hook 23 to and from the U-bolt 22 in the truck bed without climbing into the truck bed.

Figure 15:
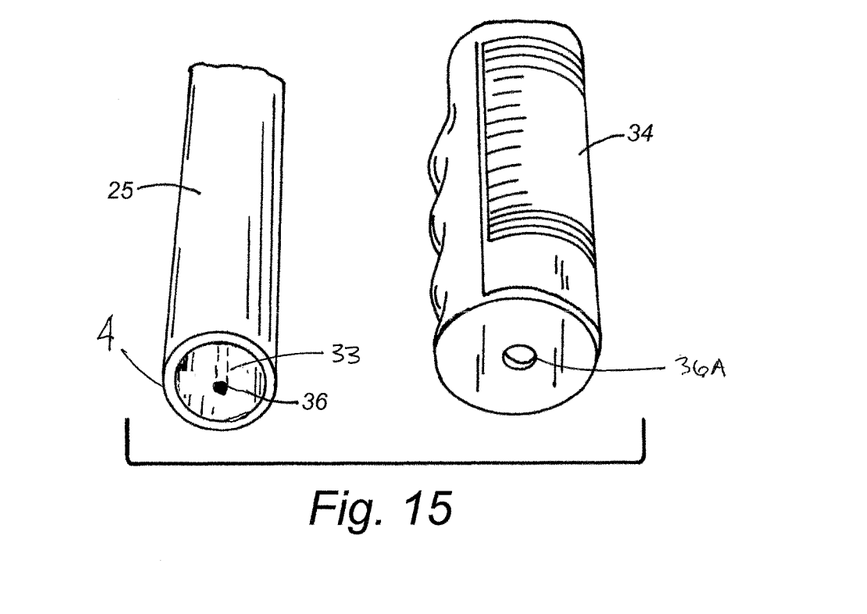
FIG. 15 depicts a perspective end view of the second end of the tool according to one embodiment, wherein the rod protrudes through the second end and the handle adapted to fit over it.

As is depicted in FIG. 15, in certain embodiments, the end of the actuation rod 33 opposite the rod loop (not shown) is fixedly attached to the center 36 of the second end of the shaft 4. In certain embodiments, the rod 33 may be affixed by way of welding. In certain embodiments, the handle 34 may further comprise an opening 36A so as to accommodate this attachment.

Figure 16:
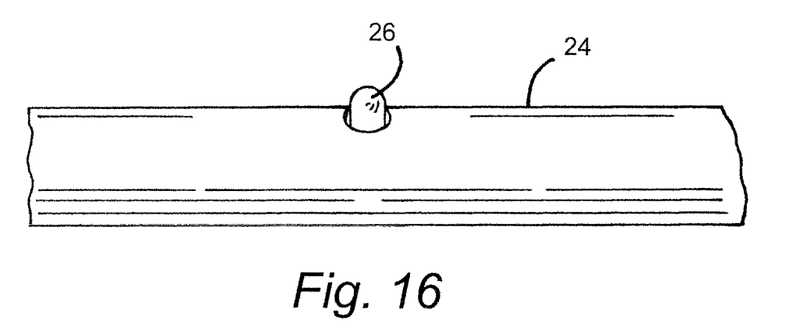
FIG. 16 is a close-up perspective view of the locking pin seated inside the shaft, according to one embodiment.
Figure 17:
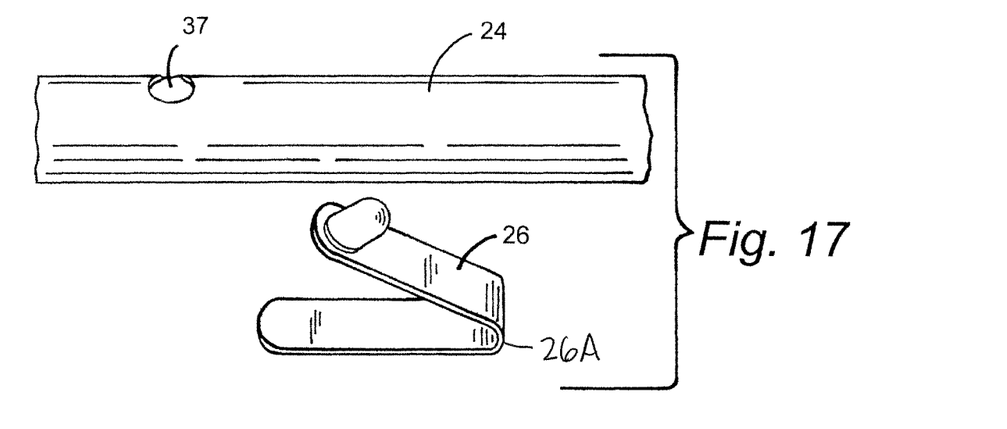
FIG. 17 is a perspective disassembled view of the shaft, wherein the locking pin is outside the shaft.

FIGS. 16-17 show various views of an exemplary embodiment of the locking pin 26, wherein the pin is mounted inside an opening 37 in the shaft 24. In this embodiment, the opening is in the first end shaft 24, though other configurations are of course possible. In certain embodiments, the locking pin 26 is a operationally coupled to a spring 26A, as is shown in FIG. 17, for placement into the shaft. Other configurations are of course possible.

Figure 18:
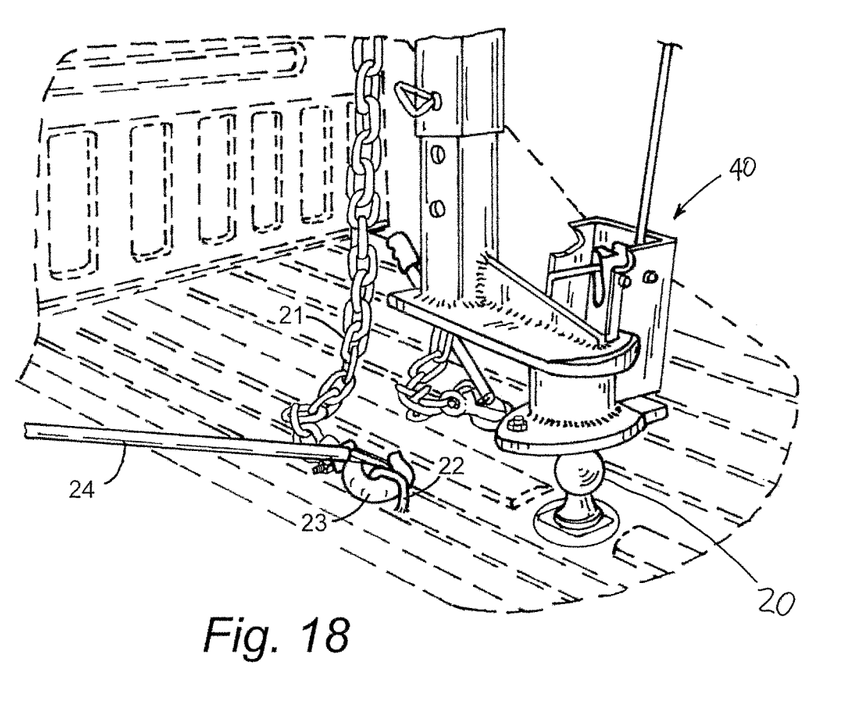
FIG. 18 is a perspective view of a truck with the gooseneck trailer and the ball hitch with an exemplary embodiment of the safety chain tool.

As is shown in FIG. 18, after the hook 23 has been attached to the U-bolt 22, the gooseneck trailer hitch 40 can be placed over the ball 20.

Although the disclosure has been described with reference to preferred embodiments, persons skilled in the art will recognize that changes may be made in form and detail without departing from the spirit and scope of the disclosed apparatus, systems and methods.

The foregoing description and drawings comprise illustrative embodiments of the present invention. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have this disclosure before them will be able to make modifications and variations therein without departing from the scope of the invention.

What is claimed is:

1. A tool with a safety chain for connection between a gooseneck trailer to a track bed, comprising: a. a telescoping shaft comprising an inner cylindrical component and an outer cylindrical component defining first and second ends; b, a coupling mechanism fixedly attached to the first end of the shaft; c, said safety chain having a first end adapted to be attached to the gooseneck trailer and a second end attached to the coupling mechanism; and d. a clasp for the coupling mechanism and moveable between open and closed position; and wherein the first and second ends of the shaft are extendable relative to one another so as to open of the clasp relative to the coupling mechanism to allow the coupling mechanism to be coupled to the track bed without climbing into the truck bed.

2. The tool of claim 1, wherein the inner cylindrical component is coaxially extendable relative to the outer cylindrical component and configured so as to allow the movement of the first and second shaft ends relative to one another so as to accommodate the extension of the first end relative to the second end.

3. The tool of claim 2 further comprising:
a. a cable having first and second ends; and
b. an actuation rod attached to the second end of the shaft and further comprising a rod loop; wherein the cable and actuation rod are configured to be mounted inside the shaft, and further wherein the first end of the cable is in operational communication with the clasp and the second end of the cable is in operational communication with the rod loop such that extension of the shaft into an extended position introduces tension on the cable and actuates the clasp to urge it into an open position relative to the coupling mechanism.

4. The tool of claim 3, further comprising a mounting bracket attached to the coupling mechanism and chain.

5. The tool of claim 4, further comprising a locking pin configured to lock the shalt in the extended position.

6. The tool of claim 5, wherein the coupling mechanism is a hook.

7. A system including a safety chain connectable between a gooseneck trailer and a truck bed, comprising: a. a telescoping shaft comprising an inner cylindrical component and an outer cylindrical component defining first and second ends; b. a coupling mechanism attached to the first end of the elongate shaft; c. said safety chain attached to the coupling mechanism; and d. a clasp on the coupling mechanism; and wherein the first and second ends of the shaft are configured to be extendable relative to one another so as to actuate the clasp, wherein the clasp and coupling mechanism are operably coupled so as to be capable of being placed in both open and closed positions by the extension and retraction of the shaft, respectively, without climbing into the truck bed.

8. The system of claim 7, wherein the inner cylindrical component is coaxially extendable relative to the outer cylindrical component so as to allow the movement of the first and second shaft ends relative to one another so as to accommodate the extension and retraction of the shaft.

9. The system of claim 8, further comprising:
a cable having first and second ends; and
b. an actuation rod fixedly attached to the second end of the shaft and further comprising a rod loop; wherein the cable and actuation rod are configured to be mounted inside the cylindrical component, and further wherein the first end of the cable is in operational communication with the clasp and the second end of the cable is in operational communication with the rod loop such that extension of the shaft into an extended position introduces tension on the cable to open the clasp, and wherein retraction of the shaft into a retracted position eliminates tension on the cable to close the clasp.

10. The system of claim 9, further comprising a mounting bracket attached to the coupling and chain.

11. The system of claim 10, further comprising a locking pin configured to lock the shaft in the extended position.

12. The tool of claim 1 wherein the clasp opens inwardly into the coupling mechanism.

13. The tool of claim 1 wherein the clasp is in a closed position when the ends of the shaft are retracted relative to one another.

14. The tool of claim 1 wherein the coupling mechanism includes a hook and the clasp retracts into the hook to an open position.

15. The tool of claim 14 wherein the clasp normally closes the hook.

16. The system of claim 7 wherein the clasp is closed when the shaft ends are retracted.

17. The system of claim 7 wherein the coupling mechanism includes a hook and the clasp retracts into the hook to an open position.

18. In combination with a gooseneck trailer safety chain having a first end connected to a gooseneck trailer, a second end with a hook adapted to be hooked to a loop in a truck bed, and a clasp pivotally mounted to the hook for movement between open and closed positions, a tool for hooking and unhooking the chain to and from the truck bed loop, the tool comprising:
a telescoping shaft having a first end attached to the hook and a second end with a handle;
a cable extending through the shaft and having a first end retained in the shaft and a second end connected to the clasp;
whereby extension of the shaft tensions the cable to pull the clasp open and retraction of the shaft untensions the cable to allow the clap to close.

* * * * *